United States Patent [19]

Tello et al.

[11] Patent Number: 5,377,160
[45] Date of Patent: Dec. 27, 1994

[54] TRANSMITTER AND RECEIVER TO RADIALLY SCAN THE CEMENTING CONDITIONS IN CASED WELLS

[75] Inventors: Lucio N. Tello; Thomas J. Blankinship, both of Fort Worth; Gerald T. Alford, Burleson, all of Tex.

[73] Assignee: Computalog Research, Inc., Fort Worth, Tex.

[21] Appl. No.: 102,614

[22] Filed: Aug. 5, 1993

[51] Int. Cl.$^5$ .............................................. G01V 1/00
[52] U.S. Cl. ...................................... 367/35; 367/86; 181/105; 166/253
[58] Field of Search ................... 367/35, 86; 181/105; 166/253

[56] References Cited

U.S. PATENT DOCUMENTS

| | | | |
|---|---|---|---|
| 3,369,626 | 2/1968 | Zemanek, Jr. | 181/0.5 |
| 4,255,798 | 3/1981 | Havira | 367/35 |
| 4,709,357 | 11/1987 | Maki, Jr. | 367/35 |
| 5,089,989 | 2/1992 | Schmidt et al. | 367/35 |

OTHER PUBLICATIONS

Schlumberger Publication No. M-090247 dated Jan. 1991.
Article on Peripheral and Longitudinal Evaluation of Cement Bond.

*Primary Examiner*—J. Woodrow Eldred
*Attorney, Agent, or Firm*—Mark W. Handley; Andrew J. Dillon

[57] ABSTRACT

A sonic well logging tool radially measures circumferential cement conditions longitudinally along a well casing. Sonic signals are transmitted from a plurality of angularly displaced transmitter-transducers, through a borehole fluid, down a longitudinally extending sector of the well casing, and then through the borehole fluid to a plurality of angularly displaced receiver-transducers, which are distally disposed from the transmitter-transducers.

36 Claims, 6 Drawing Sheets

TRANSMITTER AND RECEIVER TO RADIALLY SCAN THE CEMENTING CONDITIONS IN CASED WELLS

BACKGROUND OF THE INVENTION

1. Technical Field of the Invention

The present invention relates in general to a sonic well logging tool for radially evaluating cementing conditions about casing in cased wells, and in particular to a method and apparatus for circumferentially evaluating the placement and bonding strength of cement sealing material disposed about the exterior surface of a tubular member within a wellbore.

2. Description of the Prior Art

Prior art sonic well logging tools have been used for evaluating cement bonding about casing within wellbores. Typically, cement bonding is a term which has been used to describe a measure of an average compressive strength of cement disposed about a section of casing, which provides an indication of cement conditions within the wellbore, such as proper cure, mixture with borehole fluids, and voids or channeling within a cement sheath. In general, cement bonding measurements are used to provide an indication of cement placement about a well casing to determine whether the cement provides an adequate fluid seal to prevent fluids from flowing between portions of a wellbore.

Prior art sonic well logging tools have been used for radially determining cement conditions within cased wellbores, from which the circumferential placement of cement about the exterior of a casing can be evaluated. For example, pulse-echo type of sonic well logging tools have been used to transmit an initial sonic pulse radially outward from a sonic transducer to a spot on a casing wall, and then listen for a reflected sonic signal, or echo, with the same sonic transducer used for transmitting the initial sonic pulse. Pulse-echo sonic well logging tools typically operate at high ultrasonic frequencies ranging from 200 kHz to 500 kHz.

One example of a pulse-echo sonic tool is disclosed in U.S. Pat. No. 3,369,626, invented by J. Zemanek, Jr., entitled "Methods of an Apparatus for Production of a Visual Record of Physical Conditions of Materials Transversed by a Borehole", and issued Feb. 20, 1968. Another example is shown in U.S. Pat. No. 4,255,798, invented by Havira, entitled "Method and Apparatus for Acoustically Investigating a Casing in Cement Bond in a Borehole", and issued Mar. 10, 1981. Yet another example is set forth in U.S. Pat. No. 4,709,357, invented by Maki, Jr., entitled "Method and Apparatus for Acoustically Investigating a Borehole Casing Cement Bond", and issued Nov. 24, 1987. U.S. Pat. Nos. 3,369,626, 4,255,798, and 4,709,357 are hereby incorporated by reference as if fully set forth herein.

Prior art pulse-echo tools present several problems in radially determining cement conditions within cased wellbores. Prior art pulse-echo tool readings are affected by the presence of oil, gas, and muds having a heavy weight. Further, pulse-echo tools may not detect thin cement sheaths, such as cement sheaths having a radial wall thickness which measures less than one-half inch. Additionally, prior art pulse echo tool transducers have a spot measurement size of about one inch which may not detect smaller channels in cement, such as a channel which extends less than twenty-five percent about the circumference of a seven inch casing.

Another prior art sonic well logging tool for use in radially determining cement conditions within cased wellbores has six radially extending, motorized arms for radially pressing twelve transducers against the interior surface of casing, as disclosed in a Western Atlas International sales brochure, entitled "Cement Evaluation", and dated 1990. This prior art sonic well logging tool passes the sonic signal directly to the casing, rather than passing the sonic signal through a borehole fluid to reach the casing wall.

This later type of sonic well logging tool presents several problems in determining radial cement bonding conditions. One problem is that good surface contact must be maintained between the casing and the transducers for the tool to work properly. If good surface contact is not maintained with the casing, the sonic signal may be attenuated in areas of poor cement bonding, resulting in data readings which indicate areas of good cement bonding where the cement bonding is actually poor. Additionally, the radially extending, motorized arms only operate properly over a narrow range of casing sizes, as opposed to the type of sonic well logging tools which transmit a sonic signal through a borehole fluid.

Prior art sonic transducers for radially determining cement conditions typically transmit ultrasonic signals having frequencies which range from 200–500 kHz, and which attenuate rapidly after traveling only a very short distance along a well casing. This type of sonic transducer is not suitable for passing a sonic signal through both a borehole fluid and longitudinally along the casing wall. Additionally, prior art sonic transmitters for radially determining cement conditions are typically made from lead-metaniobate, which transmits a sonic signal over a wide spectrum of frequencies at low amplitudes. That is, prior art sonic transmitters typically transmit sonic pulses which are spread over a broad frequency range to provide a low energy in a broad range of frequencies. However, for radially measuring cement conditions longitudinally along casing wall, it is desirable to provide sonic transducers which transmit high energy levels at few frequencies, such that the sonic signal will not attenuate rapidly.

Another problem with prior art sonic well logging tools for radially determining cement conditions is that data readings from the downhole tool are often digitally transmitted, requiring additional downhole equipment which is both expensive and subject to failure. Additionally, costs are typically greater for uphole equipment used to receive and process data from a digital transmission, as opposed to processing data which is transmitted in an analog signal.

Additionally, prior art sonic well logging tools for radially determining cement conditions circumferentially about a well casing are operated on multiconductor wireline cables. Often, it is desirable to operate sonic well logging tools on monocables, that is, wireline cables having only a single insulated conductor. However, prior art sonic well logging tools for radially determining cement conditions about the circumference of a well casing cannot be operated on monocable wirelines, requiring multiple conductors for operation within a tool string.

SUMMARY OF THE INVENTION

It is one objective of the present invention to provide a sonic well logging tool for radially determining cement conditions longitudinally about a casing in a cased wellbore.

It is another objective of the present invention to provide a sonic well logging tool for evaluating an exterior placement of a sealing material about a plurality of circumferentially spaced sectors of a well casing tubular member by passing a sonic signal through a longitudinally extending distance within each circumferentially spaced sector.

It is still another objective of the present invention to provide a sonic well logging tool for operating on a monocable wireline to radially measure cement conditions about a well casing to circumferentially evaluate the placement of a cement sealing material about the well casing.

It is yet another objective of the present invention to provide a sonic well logging tool for radially determining a circumferential, placement of a cement sealing material longitudinally along an exterior surface of a casing, and to simultaneously determine, at the same depth, an average reading for placement of the cement sealing material about the exterior surface of the tubular member.

It is still yet another objective of the present invention to provide a sonic transducer for use to pass a sonic signal through a borehole fluid, longitudinally through a sector of a well casing, and to a second sonic transducer for radially measuring cement conditions longitudinally along the well casing to radially determine the circumferential placement of cement sealing material about the casing wall.

The above objectives are achieved as is now described. A sonic well logging tool is provided for radially determining cementing conditions and the circumferential placement of cement longitudinally along an exterior surface of a well casing. The sonic well logging tool transmits sonic signals from a plurality of angularly displaced sonic transmitter-transducers, through a borehole fluid, longitudinally down the casing within a longitudinally extending sector of the casing, and then back through the borehole fluid to a plurality of sonic receiver-transducers angularly displaced about the sonic well logging tool, distally disposed from the sonic transmitter-transducers. An average cement bonding amplitude and variable density log are simultaneously measured across a segment of well casing at the same time and actual depth that the radial cement conditions are being measured across that segment of casing.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
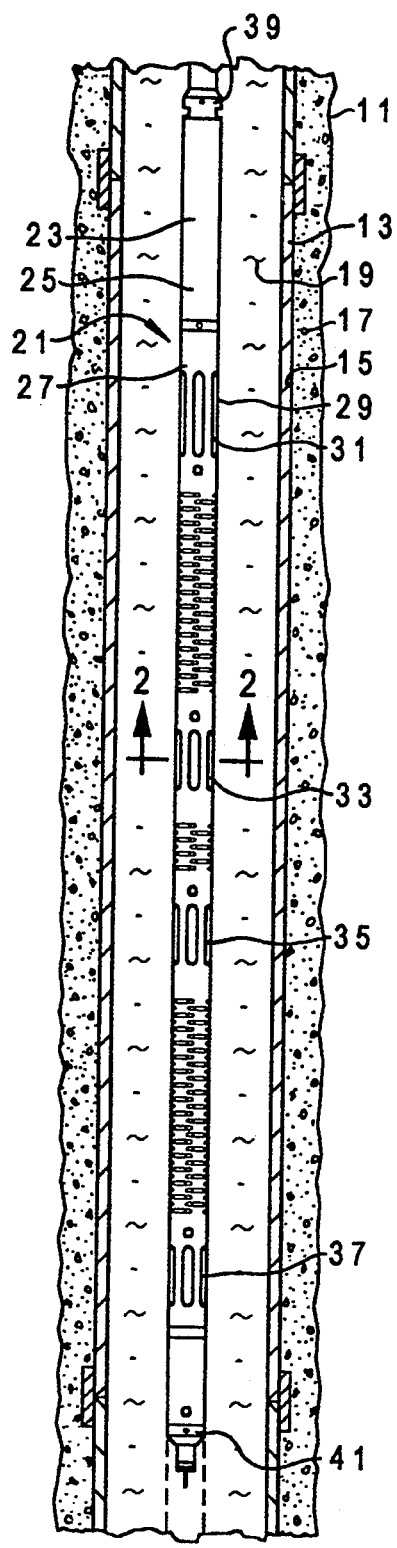
FIG. 1 is a partial longitudinal section view of a wellbore having a casing string extending longitudinally therein, and within which is depicted a perspective view of the sonic well logging tool of the preferred embodiment of the present invention.

With reference to FIG. 1, a partial longitudinal section view depicts wellbore 11 within which casing string 13 extends. Well casing string 13 includes tubular member 15. Cement 17 is shown in an annulus about the exterior of well casing string 13. Cement 17 provides a sealing material for preventing communication of fluids between different formation intervals in the annulus between wellbore 11 and well casing 13. Borehole fluid 19 is shown within casing string 13. Sonic well logging tool 21, which in the preferred embodiment of the present invention is a sector bond tool, is shown within casing 13. Sonic well logging tool 21 includes housing 23, within which electronic section 25 and sonde section 27 are disposed.

Sonde section 27 includes a plurality of sonic transducers. The plurality of sonic transducers includes monopole transmitter-transducer 29, eight sector transmitter-transducers 31, eight receiver-transducers 33, first monopole receiver-transducer 35, and second monopole receiver-transducer 37. Sector transmitter-transducers 31 provide a first portion of the sonic transducers for transmitting a sonic signal to tubular member 15, and sector receiver-transducers 33 provide a second portion of the sonic transducers for receiving the transmitted sonic signals and emitting a plurality of electric signals from which a circumferential placement and bonding of cement longitudinally along tubular member 15 may be radially determined.

Monopole transmitter-transducer 29, first monopole receiver-transducer 35 and second monopole receiver-transducer 37 provide a plurality of sonic transducers for measuring the amplitude and providing a variable density log (V.D.L.) display for a standard cement bond log. First monopole receiver-transducer 35 is spaced 3 feet away from monopole transmitter-transducer 29 for measuring the cement bonding average amplitude. Second monopole receiver-transducer 37 is spaced 5 feet away from monopole transmitter-transducer 29 for providing the variable density log (V.D.L.) display. In the preferred embodiment of the present invention, monopole transmitter-transducer transmits a sonic signal having a frequency substantially measuring 30 kHz, and first monopole receiver-transducer 35 and second monopole receiver-transducer 37 are provided to receive the 30 kHz sonic signal transmitted by monopole transmitter-transducer 29.

Housing 23 includes an upper connector 39 for connecting sonic well log tool 21 to a wireline cable, such as, for example, a high pressure wireline cable having only one insulated conductor. Housing 23 further includes lower connector 41 for either connecting to a bullnose, or for connecting sonic well logging tool 21 to other downhole well logging tools within a tool string in which sonic well logging tool 21 is included.

A pot inclinometer (not shown) is included for determining the relative rotational position of sonic well logging tool 21 within wellbore 11. In other embodiments of the present invention, an accelerometer may be utilized rather than a pot inclinometer (not shown).

Figure 2:
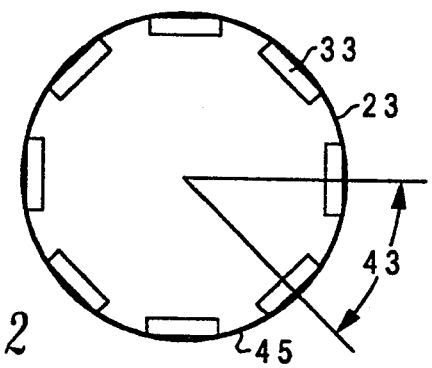
FIG. 2 is a schematic diagram depicting the placement of the sector receiver-transducers about the housing of the sonic well logging tool at Section 2-2 of FIG. 1.

Referring now to FIG. 2, a diagram schematically represents the placement of sector receiver-transducers 33 angularly about housing 23 at Section 2—2 of FIG. 1. In the preferred embodiment of the present invention, there are eight sector receiver-transducers 33 angularly spaced about circumference 45 of housing 23, separated by an angle A, which substantially measures 45 degrees. It should also be noted, that sector transmitter-transducers 31 (not shown in FIG. 2) are angularly spaced around housing 23 as depicted for sector receiver-transducers 33 in FIG. 2.

Eight sector transmitter-transducers 31 (not shown in FIG. 2) and eight sector receiver-transducers 33 are utilized in the preferred embodiment of the present invention, as opposed to using a monopole transducer for one of the above eight transducer sets of transmitter-transducers or receiver-transducers, since the sonic signal received would tend to be averaged between several sectors as it travels from a transmitter-transducer to a receiver-transducer.

Figure 3:
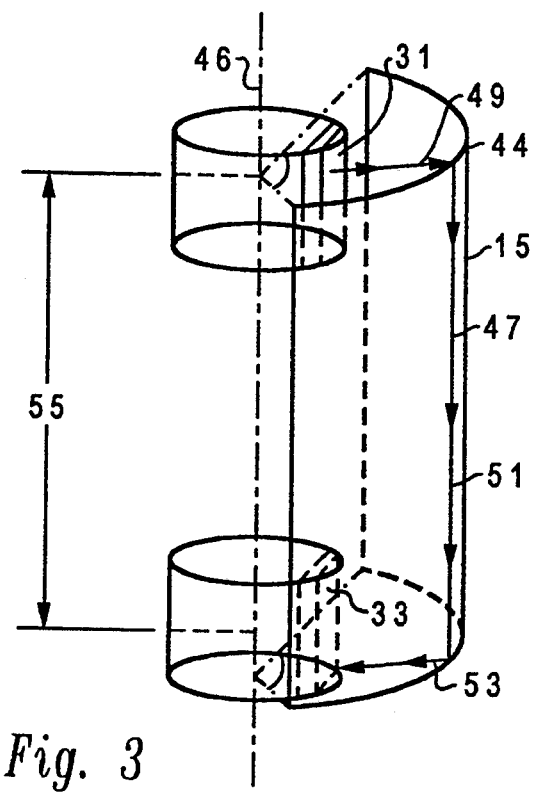
FIG. 3 is a schematic diagram depicting the distal spacing between a sector transmitter-transducer and a sector receiver-transducer of the sonic well logging tool of the preferred embodiment of the present invention.

With reference to FIG. 3, a schematic diagram depicts the distal spacing between a sector transmitter-transducer 31 and a sector receiver-transducer 33 for transmitting a sonic signal longitudinally along sector 44 of tubular member 15. Sector transmitter-transducer 31 emits a sonic signal which follows sonic pathway 47 in traveling from sector transmitter-transducer 31 to sector receiver-transducer 33. The emitted sonic signal first travels through path 49 to tubular member 15, then along path 51 to pass through sector 44 in a direction which extends parallel to a longitudinal axis of tubular member 15, and then back through borehole fluid 19 along path 53 to sector receiver-transducer 33. When the sonic signal is traveling through sonic pathway 47, it travels in a longitudinally extending direction along path 51, which, in the preferred embodiment of the present invention, extends parallel to longitudinal distance 55. Sector sonic transmitter-transducer is distally spaced a longitudinal distance, which substantially measures 2 feet in the preferred embodiment of the present invention.

Sonic signal frequencies ranging substantially between 90 and 130 kHz have been determined to provide an optimal sonic signal which may be passed longitudinally through a well casing, such as well casing string 13, to provide a radial indication of the circumferential placement of a cement sealing material longitudinally along the exterior of the well casing. In the preferred embodiment of the present invention, a 100 kHz signal is used. Additionally, the 2-foot sector transmitter-transducer to sector receiver-transducer spacing has been determined to provide optimal performance for radially measuring attenuation of a sonic signal having a frequency ranging substantially between 90 and 130 kHz which passes longitudinally along well casing string 13.

Figure 4:
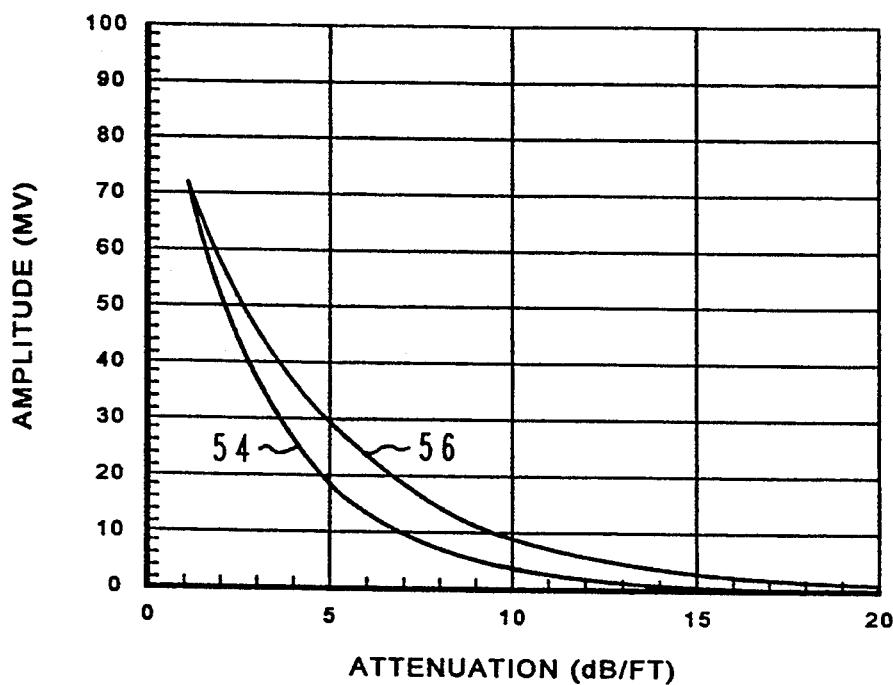
FIG. 4 is a graphic representation comparing the resulting amplitude emitted by a sonic receiver-transducer for varying attenuations per unit distance of the sonic signal as it passes over a 2-foot and a 3-foot transmitter-to-receiver spacing.

Referring now to FIG. 4, a graphic representation depicts the amplitude of an electrical signal emitted by a sector sonic receiver-transducer for a 2-foot spacing 56 and a 3-foot spacing 54 from a sector sonic transmitter-transducer over multiple levels of sonic attenuation per unit length along a well casing. The 2-foot spacing provides a more linear response than the three foot spacing for sonic attenuations between 4 and 12 db/foot, as compared to the 3-foot spacing. For sonic attenuations greater than 3 db/foot, which is the range of interest for cement bond evaluation, a change in emitted amplitude corresponding to a change in sonic attenuation is larger for the 2-foot spacing than for the 3-foot spacing. Additionally, the 2-foot spacing provides better vertical resolution than the 3-foot spacing.

Figure 5:
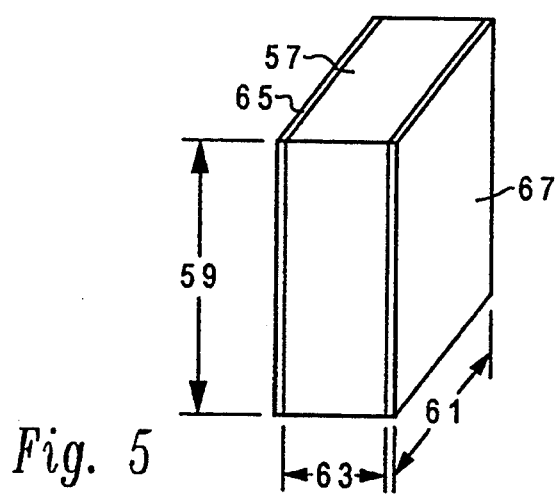
FIG. 5 is perspective view which depicts a sector sonic transducer of the sonic well logging tool of the preferred embodiment of the present invention.

With reference to FIG. 5, a perspective view depicts sector sonic transducer 57, such as that used for sector transmitter-transducers 31 and sector receiver-transducers 33 in the preferred embodiment of the present invention. Sector sonic transducer 57 has a length 59 of 1.5 inches, a width 61 of 0.53 inches, and a thickness 63 of 0.2 inches in the preferred embodiment of the present invention.

Electrical contact plates 65 and 67 are placed adjacent to sector sonic transducer 57 so that they are separated by thickness 63. Electrical contact plates 65 and 67 are used for applying a 1,000 volt DC pulse for 15 microseconds across the thickness 63 of sector sonic transducer 57 to excite sector sonic transducer 57 to vibrate and emit the 100 kHz sonic signal from a mode of vibration across width 61.

Sector sonic transducer 57 is formed into the shape of a rectangular plate in the preferred embodiment of the present invention since this rectangular shape provides advantages in transmitting a strong sonic signal which places a high amount of energy in a frequency that ranges substantially between 90–130 kHz, as opposed to prior art sonic transducers which are formed to have cylindrical shapes and others which are shaped as circular plates.

Figure 6:
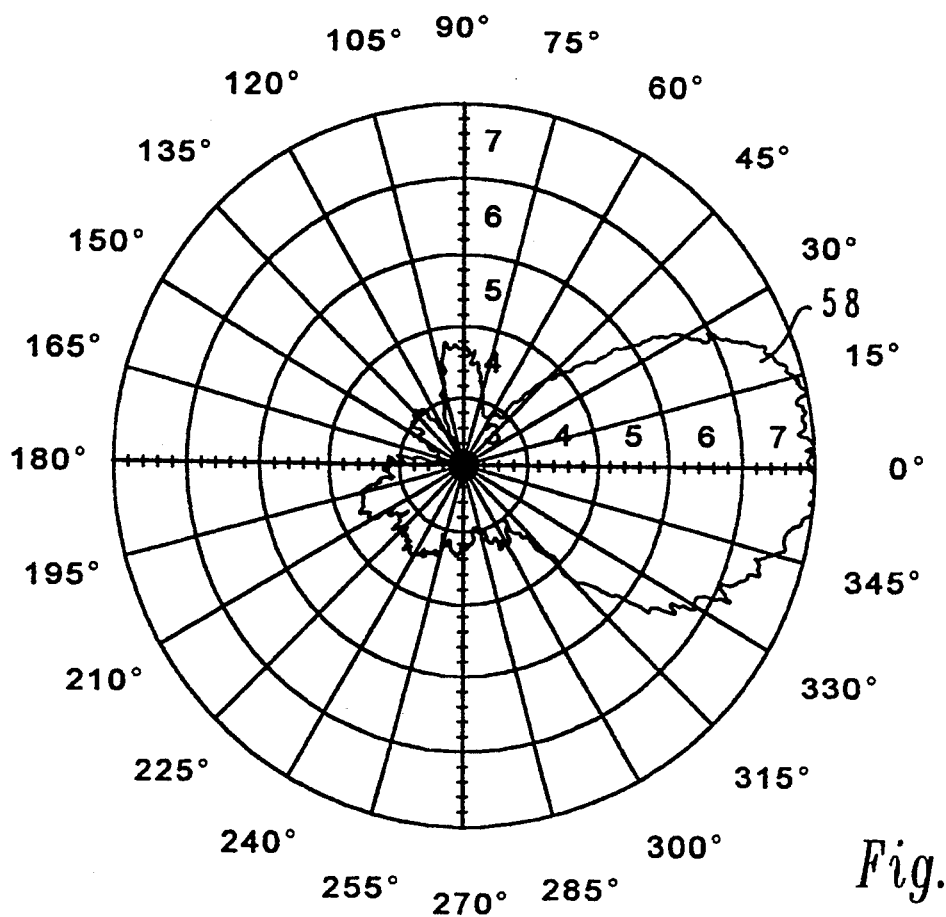
FIG. 6 is a graphic representation depicting the scope of angular coverage about the circumference of well casing of a sector sonic transmitter-transducer and receiver-transducer pair of the present invention.

Further, the rectangular shape of the sonic sector transducers of the present invention provide improvements in circumferential resolution over sonic transducers in the prior art. Referring now to FIG. 6, a graphic representation depicts the scope of angular coverage of a sector sonic transmitter-transducer and receiver-transducer pair about the circumference of a well casing. Curve 58 of FIG. 6 was plotted by taking readings in a 5½ inch free casing as a sector sonic receiver-transducer was held in a fixed position within the casing along the radius extending at 0 (zero) degrees, and a sector sonic transmitter-transducer was rotated about a circumference which is spaced 2-foot above the sonic receiver-transducer to take readings at the various positions shown. The readings are shown plotted along the concentric circles which are scaled from three volts at the center point of the circles to eight volts at the outermost circle at which the angular orientations are labeled. Receiver-transducer readings are shown scaled in volts since the instrumentation used for conducting the test, of which the results are depicted in FIG. 6, amplified the signal emitted from the sonic receiver-transducer more than the electronics portion of the present invention.

As depicted in FIG. 6, the sector sonic transducer of the present invention disperses the sonic signal over a circumferentially extending portion of the casing, rather than focusing the sonic signal to a smaller spot-size on the casing, as do prior art sonic transducers for radially determining cement placement about a circumference of the casing. Within a sector representing one-eighth of the circumference of the casing, the signal is only attenuated from 8 volts to around 7 volts at roughly 22½ degrees from a zero-point central radius for the 45 degree sector. Thus, as depicted by FIG. 6, the sector sonic transducers of the present invention both focus the sonic signal received by the receiver-transducer over only a portion of the casing, while dispersing the sonic signal over a specific casing segment so that smaller cement channels will not be missed, as were missed with prior art sonic well logging tools.

Referring again to FIG. 5, when sector sonic transducer 27 is electrically excited to vibrate by application of the 1,000 volt DC pulse for 15 microseconds, it will have three primary resonance frequencies. A first resonance frequency of 40 kHz from a length mode of vibration across length 59, a second resonance frequency of 100 kHz across width 61, and a third resonance frequency of 400 kHz from a thickness mode of vibration across thickness 63.

In the preferred embodiment of the present invention, sector sonic transducer 57 is formed from a piezoceramic composite material sold under the trade name PZT-4 by Channel Industries, Inc. of Santa Barbara, Calif. PZT-4 is a ceramic composite of lead-zerconate-titaniate, which is formed by combining metal oxide particles of lead oxide, zerconium oxide, titanium oxide, and a binder material. The combined materials are then mixed, heated to a high temperature, and a high voltage is applied to bind the above mixture of materials together. PZT-4 was specifically selected for use in the preferred embodiment of the present invention since it can be electrically exited to vibrate and place a high energy in a frequency range between 90 and 130 kHz. PZT-4 does not transmit a strong sonic signal at frequencies which correspond to the length mode of vibration across length 59, as compared to the width mode of vibration which arises across width 61 of sector sonic transducer 57.

The 40 kHz signal of the length mode of vibration will not interfere with receiving the 100 kHz signal at sector receiver transducers 33 since the material from which sector transmitter-transducers 31 are made, PZT-4, will not transmit strong sonic signals at that frequency, as compared to the strength of sonic signals transmitted across the width mode of vibration at 100 kHz. Transducer 57 is formed from PZT-4, and emits a weak 40 kHz signal from the length mode of vibration, while emitting a relatively strong 100 kHz signal for radially measuring cement bonding parameters longitudinally along a sector of a well casing. Thus, the preferred embodiment of the present invention provides a sonic transducer for transmitting a strong sonic signal which places higher energy levels in a narrower range of frequencies than prior art sonic transducers, and prevents the 40 kHz signal of the length mode of vibration from interfering with 100 kHz sonic signal used for radially measuring the cement bond.

Referring again to FIG. 3, longitudinal distance 55 of 2 feet between sector transmitter transducers 31 and sector receiver transducers 33 is a length that is optimally selected for passing the 100 kHz signal through sector 44 to sector receiver transducer 33 from sector transmitter-transducer 31. The 400 kHz signal will attenuate quickly in traveling across longitudinal distance 55 of tubular member 15, and thus will not interfere with the 100 kHz sonic signal of the length mode of vibration.

Referring again to FIG. 5, electrical contact plates 65 and 67 are further used to prevent sector sonic transducer 57 from resonating, or ringing, once the sonic signal has been transmitted. The sector sonic signal discussed herein for the preferred embodiment of the present invention is actually a sharp sonic pulse. Sector sonic transducer 57 is clamped by shunting electrical contact plate 65 and electrical contact plate 67 to ground to prevent sector sonic transducer from ringing, or resonating, and to thus provide a sharp sonic pulse for determining the circumferential placement of cementing material behind tubular member 15.

Figure 7:
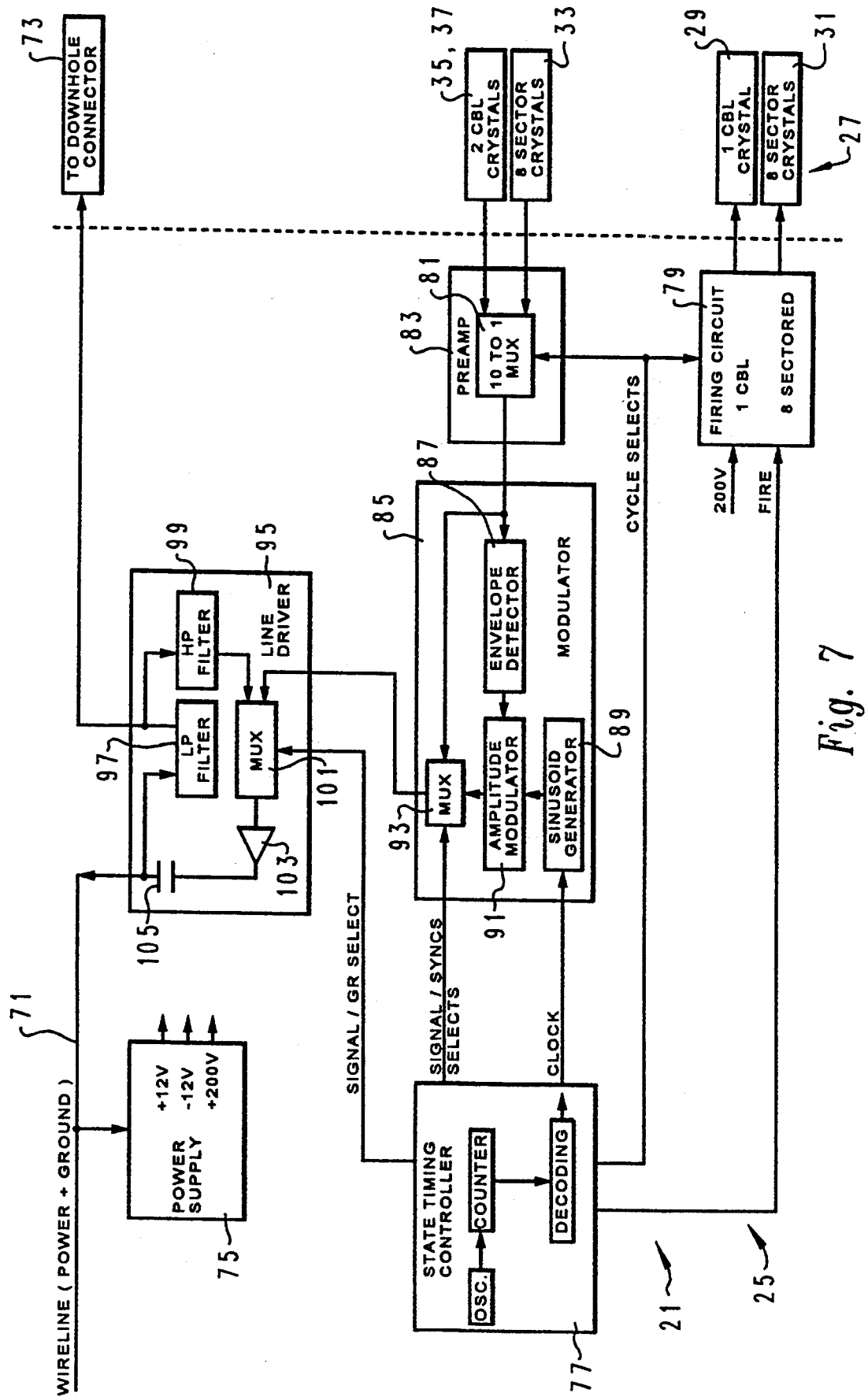
FIG. 7 is block diagram depicting the electronics portion of the sonic well logging tool of the preferred embodiment of the present invention.

With reference to FIG. 7, a block diagram schematically depicts the electronics portion of electronic section 25 and sonde section 27. Wireline cable 71 is shown extending to power supply 75. Power supply 75 provides power to sonic well logging tool 21. State and timing controller 77 provides a fire signal to firing circuit 79 to control firing of monopole transmitter-transducer 29 and sector transmitter-transducers 31 in sonde section 27. State timing controller 77 additionally selects the cycle, or sequence, in which sonic transducers are fired, and selects which sonic transducers are gated to pass a received signal to multiplexer 81, preamp 83, and modulator 85.

Modulator 85 includes envelope detector 87, sinusoid generator 89, amplitude modulator 91, and multiplexer 93. State timing controller 77 selects whether multiplexer 93 passes one of the CBL sonic signals from monopole receiver transducer 35 or monopole receiver transducer 37, or whether multiplexer 93 passes an amplitude modulated signal from amplitude modulator 91, which corresponds to one of the electrical signals emitted from sector receiver-transducers 33. Amplitude modulator 91 receives a 20 kHz sinusoid signal from sinusoid generator 89. Amplitude modulator 91 additionally receives an electric signal from envelope detector 87, which takes the electrical signal generated by one of the sector receiver transducers 33, as selected by multiplexer 81, rectifies and then integrates the signal within any envelope to provide a signal to amplitude modulator 91. Amplitude modulator 91 then modulates the amplitude of the 20 kHz sinusoidal signal generated by sinusoid generator 89 to an amplitude level which corresponds to the signal from envelope detector 87. Multiplexer 93 then passes the appropriate signal, as selected by state timing controller 77, to line driver 95.

Line driver 95 includes a low pass filter 97 for passing power from wireline 71 to downhole connector 73 for powering tools which may be positioned in the portion of the tool string below sonic well logging tool 21, such as, for example, a gamma ray tool. Line driver 95 further includes high pass filter 99 for passing signals from downhole tools such as, for example, gamma ray counts from a gamma ray tool which may be connected below sonic well logging tool 21. Line driver 95 further includes multiplexer 101, which is selectively operated by state timing controller 77 to either pass the signal from multiplexer 93 of modulator 85, or to pass the signal from the high pass filter 99, which may pass signals such as gamma ray counts from a gamma ray tool. Amplifier 103 is provided between multiplexer 101 and wireline 71. Capacitor 105 is provided to prevent DC voltage from passing from wireline 71 into amplifier 103 and multiplexer 101.

Referring now to FIGS. 8a through 8d, timing diagrams depict the time sequence for controlling sonic well logging tool 21 of the preferred embodiment of the present invention. These timing diagrams depict operation of state timing controller 77 (shown in FIG. 7) as it operates to control the timing and gating functions of sonic well logging tool 21. FIGS. 8a through 8d may be referred to by those skilled in the art to determine timing and gating operations for sonic well logging tool 21.

Figure 9:
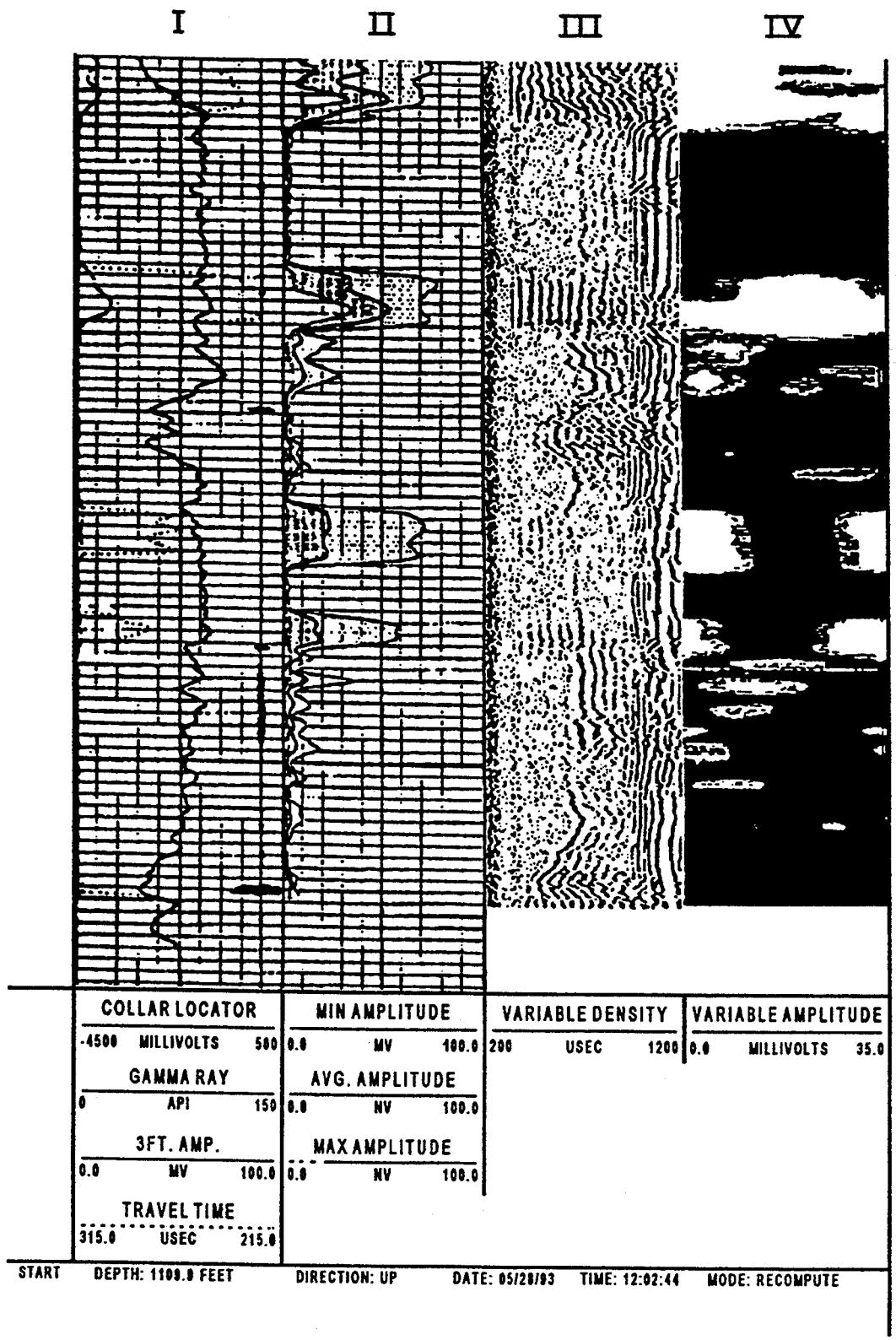
FIG. 9 is an example of a possible well log presentation of cement bonding data measured by the sonic logging tool of the present invention.

With reference to FIG. 9, an example of a well log for presenting cement bonding data for the present invention is depicted. Column I depicts standard cement bond logging information for the 3-foot receiver-transducer. Column II depicts cement bonding information for the 2-foot sector receiver-transducers. Column III depicts a standard Variable Density Log (V.D.L.) presentation for the 5-foot receiver-transducer. Column IV depicts a variable amplitude presentation of circumferential placement of cement about the exterior circumference of the casing, with darker shading showing a measurement of higher compressive strength for the cement. The above presentations are well known to those skilled in the art.

Figures 8A, 8B:
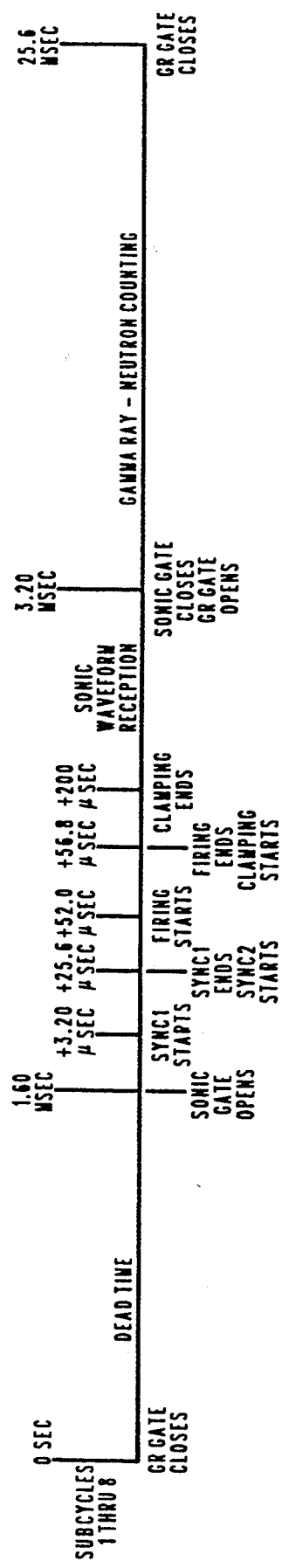
FIGS. 8a through 8d are timing diagrams which schematically depict the timing sequences for operation of the sonic well logging tool of the preferred embodiment of the present invention.

Operation of the electronics portion of sonic well logging tool 21 is now discussed. With reference to FIG. 8a, a timing diagram represents one complete operational cycle for sonic well logging tool 21. One complete tool cycle has a duration of 307.2 milliseconds, and is divided into 12 subcycles of 25.6 milliseconds each. Three complete tool cycles are completed in one second, which if logged at a linear rate within the wellbore of 30 feet per minute, results in six samples per foot.

Referring now to FIG. 8b, a timing diagram represents subcycles 1 through 8 for operation of the eight sector transmitter-transducers 31 and eight sector receiver-transducers 33. Each cycle one through eight individually corresponds to the 25.6 milliseconds shown. Each subcycle begins with a 1.60 millisecond dead time, followed by a 1.60 millisecond sector sonic gate, and lastly follows a 22.4 millisecond gamma ray-neutron gate. A particular sector sonic transmitter-transducer corresponding to a particular subcycle is fired starting after a 52.0 microsecond delay which follows the 1.60 millisecond dead time. Firing ends and clamping begins 56.8 microseconds after the end of the 1.60 millisecond dead time period. The sonic waveform is received after clamping ends, and the sonic gate closes 1.6 microseconds after the dead time, which corresponds to 3.20 milliseconds after the particular subcycle began.

Figure 8C:
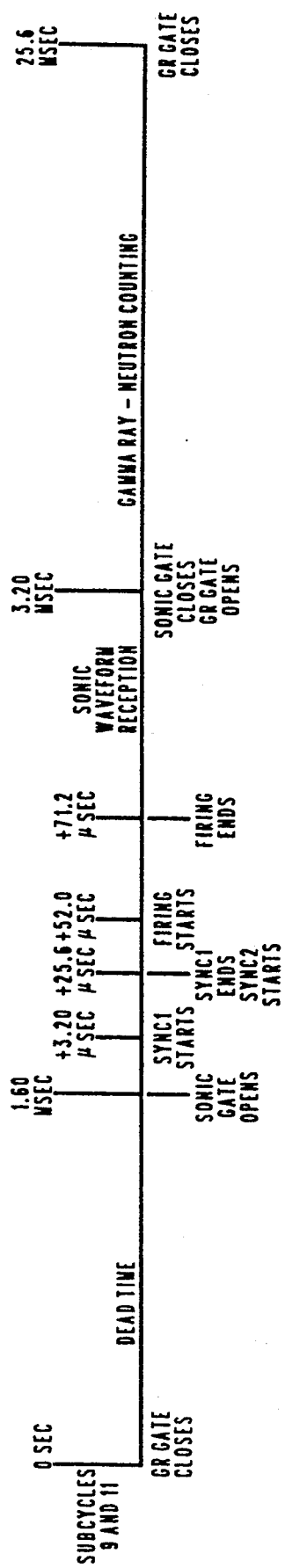

With reference now to FIG. 8c, a timing diagram represents subcycles 9 and 11 for operation of monopole transmitter-transducer 29, first monopole receiver-transducer 35, and second monopole receiver-transducer 37 for measuring the 3-foot average amplitude signal and the 5-foot variable density log signal. Subcycles 9 and 11 are similar to subcycles 1 through 8, except that firing lasts for a longer period of time, until 71.2 microseconds after the 1.60 millisecond dead time.

Figure 8D:
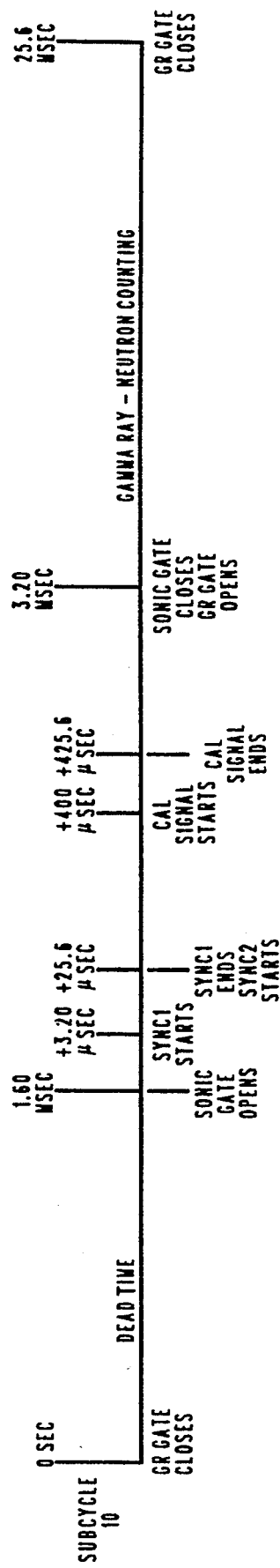

Referring now to FIG. 8d, a timing diagram represents subcycle 10 for passing a calibration signal from sonic well logging tool 21 to surface recording equipment to account for variations in electrical parameters of different wirelines on which sonic well logging tool 21 may be run. Notice that the sonic gate opens and closes at the same time in all subcycles; the difference between the cycles is within the sonic gate itself as shown in FIG. 8b through 8d.

Referring again to FIG. 8a, subcycle 12 is a dead time provided to allow the 5-foot V.D.L. sonic signal to die down before the first subcycle begins again.

Operation of sonde section 27 of sonic well logging tool 21 is now described. With reference to FIG. 1, sonic well logging tool 21 is lowered within borehole fluid 19 within tubular member 15 of well casing 13. Sonic well logging tool 21 is then operated, as depicted by the timing diagrams of FIGS. 8a through 8d, through one cycle in which it measures the attenuation of eight 100 kHz sonic signal pulses which are each passed through one of eight sectors of tubular member 15, a 3-foot monopole average amplitude reading of a 30 kHz sonic signal, and provides a signal for a variable density log display of a 5-foot receiver to transmitter spacing of the 30 kHz signal transmitted from monopole transmitter-transducer 29.

Referring now to FIG. 2, sector transmitter-transducers 31 and sector receiver-transducers 33 are spaced at 45° angle 43 for passing a sonic signal to respective sectors of a tubular member within which sonic transducers 31 and 33 are disposed.

With reference to FIG. 3, a sonic signal passes through sonic pathway 47 for a longitudinally extending distance along path 51, which in the preferred embodiment of the present invention is parallel to longitudinal axis 46. The 100 kHz sonic signal is attenuated as it passes through path 51 by an amount which corresponds to the placement of cement material longitudinally about sector 44, between tubular member 15 and wellbore 11 (shown in FIG. 1).

Referring now to FIG. 1, monopole transmitter 29 is operated during subcycle 9 to pass a sonic signal through tubular member 15 to monopole receiver-transducer 35 to provide a 3-foot monopole amplitude signal. Additionally, monopole transmitter-transducer 29 is fired to pass a sonic signal through tubular member 15 to second monopole receiver-transducer 37 to provide a variable density log display signal. It should be noted that the 3-foot amplitude signal and the 5-foot variable density log display are standard features of a standard cement bond log. However, prior art tools do not radially determine the placement of cement circumferentially about a well casing simultaneously, at the same depth, with an average cement bond log reading, as does the preferred embodiment of the present invention.

The present invention has several advantages over prior art sonic well logging tools used to determine the circumferential placement of cement about a tubular member of a well casing. The sonic well logging tool of the present invention passes sonic signals through a plurality of sectors of a well casing, in a longitudinally extending direction. Since the sonic signals are passed through the casing sectors in a longitudinally extending direction, the sonic well logging tool of the present invention is not as adversely affected by gas permeated cement, and thin cement sheaths which have sheath-wall thicknesses of less than ½ inch.

Additionally, the sonic well logging tool of the present invention has a larger measurement spot size than prior art well logging tools for determining the circumferential placement of cement about a tubular member.

The larger measurement spot size of the present invention is provided by both forming the sector sonic transducers with a larger radially-facing surface area, and by passing the sector sonic signals through the casing in a longitudinally extending direction. The preferred embodiment of the present invention can detect a cement channel in 7 inch casing which extends less than 25 percent around the circumference of a tubular member.

The sonic well logging tool of the present invention passes sonic signals through a borehole fluid, rather than pressing radially extended pads against a well casing interior. As a result, the radial placement of the sector sonic transducers within the casing is not as critical as the pad transducers, and the sonic well logging tool of the present invention may be used over a wider range of different casing sizes without removal from the wellbore for logging multiple casing sizes.

Additionally, the present invention provides tighter angular resolution than the prior art sonic well logging tools having arms which press radially extending pads against a casing interior. The sonic well logging tool of the preferred embodiment includes receiver-transducers which are angularly spaced 45 degrees apart for receiving sonic signal from a sector of the casing, as opposed to a 60 degree angular coverage about a section of the casing.

The sonic well logging tool of the present invention simultaneously measures both an amplitude average indication of cement bonding over an interval about a tubular member, and an indication of circumferential placement of cement about the tubular member. Measurements for providing the amplitude average indication of cement bonding and measurements for providing the indication of circumferential placement of cement are taken simultaneously, at the same wellbore depth interval.

The sonic well logging tool of the present invention may be operated on monocables, that is, wirelines having only one conductor. This allows sonic logs to be run under higher ranges of pressures than can typically be achieved with multiconductor wireline cables.

Further, the sector sonic transducers of the preferred embodiment of the present invention are made from a peizo-ceramic material which is a higher quality material, having a high quality factor for electrically exciting to emit a sonic pulse, the sonic signal. The PZT-4 material from which the sector sonic transducers are made will emit a sonic pulse in which an amount of sonic energy emitted is spread over a smaller frequency range than the sonic energy emitted from sonic transducers made from different materials, such as, for example, lead-metaniobate which transmits a wide spectrum of frequencies at very low amplitudes, that is, spreads the transmitted sonic energy over a broad range of frequencies.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A sonic well logging tool for lowering into a borehole fluid within a tubular member and evaluating a circumferential placement of a sealing material about an exterior surface of said tubular member, said sonic well logging tool comprising:

a housing having a longitudinal axis extending therethrough;

an electronics section within said housing for operating said sonic well logging tool and transmitting a plurality of data readings to a recording device;

a plurality of sonic transducers mounted to said housing, said plurality of sonic transducers including:

a first group of sonic transducers angularly displaced about said longitudinal axis for sequentially transmitting a plurality of sonic signals through said borehole fluid and to a plurality of sectors of said tubular member, wherein each of said first group of sonic transducers have an exterior shape which defines a thickness and a width, with said width extending lateral to said thickness, and wherein said plurality of sonic signals are emitted as width mode vibrations in response to applying a voltage across said thickness; and a second group of sonic transducers angularly displaced about said longitudinal axis, each of said second group of sonic transducers distally disposed from at least a respective one of said first group of sonic transducers, for emitting a plurality of electrical signals across said thickness in response to receiving from said borehole fluid at least a portion of said plurality of sonic signals which have travelled in longitudinally extending direction through said tubular member, wherein said plurality of electrical signals provide an indication of said circumferential placement of said sealing material about a sector in said longitudinally extending direction traversed by a particular one of said plurality of sonic signals.

2. The sonic well logging tool of claim 1, wherein said longitudinally extending direction is parallel to a central longitudinal axis of said tubular member.

3. The sonic well logging tool of claim 1, wherein each of said second group of sonic transducers are distally disposed from said at least a respective one of said first group of sonic transducers by a longitudinal distance which substantially measures two feet.

4. The sonic well logging tool of claim 1, wherein said width is sized for emitting said plurality of sonic signals from a width mode of vibration having a primary resonance frequency within a frequency range which is substantially between 90 kHz and 130 kHz.

5. The sonic logging tool of claim 4, further comprising:

a modulator which is included within said electronics section for emitting an amplitude modulated analog data signal in response to said plurality of electrical signals, which are emitted by said second group of sonic transducers and which have said primary resonance frequency ranging substantially between 90 kHz and 130 kHz, wherein said amplitude modulated analog data signal has a frequency range of substantially not more than 40 kHz for transmitting uphole over a wireline.

6. The sonic well logging tool of claim 1, wherein at least part of said sonic transducers are formed from a piezo-ceramic composite material which includes lead oxide, zirconium oxide, and titanium oxide.

7. The sonic well logging tool of claim 1, wherein said external shade of said first group of said plurality of sonic transducers is a rectangular plate shape.

8. The sonic well logging tool of claim 1, wherein at least said first group of sonic transducers are formed from a piezo-ceramic composite material which includes lead oxide, zirconium oxide, and titanium oxide, and said exterior shape is a flat rectangular plate shade.

9. The sonic logging tool of claim 1, further comprising:
   a monopole transmitter-transducer for transmitting a second plurality of sonic signals to said tubular member;
   at least one monopole receiver-transducer for emitting a third plurality of electrical signals in response to receiving said second plurality of sonic signals after said second plurality of sonic signals have travelled longitudinally along said tubular member for at least one longitudinal distance; and
   a means for determining an average attenuation of said second plurality of sonic signals from said third plurality of electrical signals to evaluate an average placement of said sealing material about said tubular member along said at least one longitudinal distance.

10. The sonic well logging tool of claim 9, wherein said plurality of sonic transducers are disposed about said housing along a first housing interval which substantially overlaps said at least one longitudinal distance along which said monopole transmitter-transducer and said at least one monopole receiver-transducer are spaced about said housing, wherein said plurality of sonic transducers, said monopole transmitter-transducer, and said at least one monopole receiver transducer are simultaneously operated for determining said indication of circumferential placement of said sealing material substantially concurrent with measuring said average placement of said sealing material.

11. The sonic well logging tool of claim 1, wherein said sonic well logging tool is secured to a wireline for lowering within said tubular member, and operable utilizing a single insulated conductor within said wireline for transmitting an analog data signal uphole which represents said plurality of electrical signals.

12. A sonic well logging tool for lowering within a tubular member and evaluating an exterior placement of a sealing material about a plurality of circumferentially spaced sectors of said tubular member at a plurality of well depth intervals, said sonic well logging tool comprising:
   a housing having a longitudinal axis extending therethrough;
   an electronics section within said housing for operating said sonic well logging tool and transmitting a plurality of data readings to a recording device;
   a plurality of sonic transducers disposed within said housing and having a flat rectangular shape which defines a thickness and a width, wherein said thickness is generally orthogonal to said width, said plurality of sonic transducers further including:
     a first group of sonic transducers angularly displaced about said longitudinal axis at a first point about said housing for sequentially transmitting a plurality of sonic signals to said plurality of circumferentially spaced sectors of said tubular member at said plurality of well depth intervals; and
     a second group of sonic transducers which are angularly displaced about said longitudinal axis at a second point distal from said first point for sequentially emitting a plurality of electrical signals in response to receiving said plurality of sonic signals after said plurality of sonic signals have passed in at least one longitudinally extending direction along said tubular member within said plurality of circumferentially spaced sectors, wherein said plurality of electrical signals provides an indication of said circumferential placement of said sealing material about a sector in said longitudinally extending direction traversed by a particular one of said plurality of sonic signals.

13. The sonic well logging tool of claim 12, wherein said longitudinally extending direction is parallel to a central longitudinal axis of said tubular member.

14. The sonic well logging tool of claim 12, wherein said first point is distal from said second point for providing said longitudinally extending distance which substantially measures two feet.

15. The sonic well logging tool of claim 12, wherein said plurality of sonic signals have a frequency range which is substantially between 90 kHz and 130 kHz.

16. The sonic logging tool of claim 12, further comprising:
   a modulator which is included within said electronics section for emitting an amplitude modulated analog data signal in response to said plurality of electrical signals, which are emitted from said second group of sonic transducers and which have a frequency range substantially between 90 kHz and 130 kHz, therein said amplitude modulated analog data signal is emitted over a frequency range of substantially not more than 40 kHz for transmitting uphole over a wireline.

17. The sonic well logging tool of claim 12, wherein at least part of said sonic transducers are formed from a piezo-ceramic composite material, which includes lead oxide, zirconium oxide, and titanium oxide.

18. The sonic logging tool of claim 12, further comprising:
   a monopole transmitter-transducer for transmitting a second plurality of sonic signals to said tubular member;
   at least one monopole receiver-transducer for emitting a third electrical signal in response to receiving said second plurality of sonic signals after said second plurality of sonic signals have travelled longitudinally along said tubular member for at least one longitudinal distance; and
   a means for determining an average attenuation of said second plurality of sonic signals from said third plurality of electrical signals to evaluate an average placement of said sealing material about said tubular member at said well depth interval.

19. The sonic well logging tool of claim 18, wherein said plurality of sonic transducers are disposed about said housing along a first housing interval which substantially overlaps said at least one longitudinal distance along which said monopole transmitter-transducer and said at least one monopole receiver-transducer are spaced about said housing, wherein said plurality of sonic transducers, said monopole transmitter-transducer, and said at least one monopole receiver transducer are simultaneously operated for determining said indication of circumferential placement of said sealing material substantially concurrent with measuring said average placement of said sealing material.

20. The sonic well logging tool of claim 12, wherein said sonic well logging tool is secured to a wireline for lowering within said tubular member, and operable utilizing a single insulated conductor within said wireline for transmitting a data signal uphole which corresponds to said plurality of electrical signals.

21. A method for use in a wellbore to evaluate an exterior placement of a sealing material about a plurality of circumferentially spaced sectors of a tubular member at a well depth interval, said method comprising the steps of:
   lowering a sonic well logging tool downhole within said wellbore and into a borehole fluid within said tubular member;
   sequentially transmitting a plurality of sonic signals from said sonic well logging tool, through said borehole fluid, and to said plurality of circumferentially spaced sectors for passing in a longitudinally extending direction at least one of said plurality of sonic signals through each of said plurality of circumferentially spaced sectors;
   sequentially receiving said plurality of sonic signals after said plurality of sonic signals have each passed in said longitudinally extending direction along said tubular member within one of said plurality of circumferentially spaced sectors, and passed through said borehole fluid to said sonic well logging tool;
   emitting a plurality of electrical signals in response to receiving said plurality of sonic signals after said sonic signals have passed through said borehole fluid, passed in said longitudinally extending direction through said plurality of circumferentially spaced sectors, and passed through said borehole fluid to said sonic well logging tool, wherein said plurality of electrical signals are emitted over a frequency range which is greater than 40 kHz;
   transmitting an amplitude modulated analog data signal uphole in response to said plurality of electrical signals which occur within said frequency range which is substantially greater than 40 kHz, said amplitude modulated analog data signal having a frequency range of substantially not more than 40 kHz for transmitting uphole over a wireline; and
   wherein a local placement of said sealing material about particular ones of said plurality of circumferentially spaced sectors is determined by processing said amplitude modulated analog data signal for an indication of which of said plurality of circumferentially spaced sectors sufficiently attenuated a portion of said plurality of sonic signals which passed therethrough in said longitudinally extending direction.

22. The method of claim 21, wherein said longitudinally extending direction extends parallel to a central longitudinal axis of said tubular member.

23. The method of claim 21, wherein said plurality of sonic signals have a sonic frequency ranging substantially between 90 kHz and 130 kHz; and
   wherein said frequency range for said plurality of electrical signals is substantially between 90 and 130 kHz.

24. The method of claim 21, further comprising the steps of:
   transmitting a second plurality of sonic signals from a monopole transmitter to said tubular member;
   receiving said second plurality of sonic signals after said second plurality of sonic signals have travelled longitudinally along said tubular member; and
   observing an average attenuation of said second plurality of sonic signals to evaluate an average placement of said sealing material about said tubular member at said well depth interval.

25. The method of claim 24, wherein said plurality of sonic signals and said second plurality of sonic signals are sequentially transmitted about overlapping sections of said sonic well logging tool for passing along said tubular member at substantially a same well depth interval within substantially a same time interval for measuring an indication of circumferential placement of said sealing material substantially concurrent with measuring said average placement of said sealing material.

26. The method of claim 21, further comprising the steps of:
   securing said sonic well logging tool to a wireline for lowering within said wellbore; and
   operating said sonic well logging tool utilizing a single insulated conductor within said wireline for transmitting said amplitude modulated analog data signal uphole which represents said plurality of electrical signals.

27. The sonic well logging tool of claim 1, wherein each of said second group of sonic transducers have said exterior shape which defines said thickness and said width, with said width extending lateral to said thickness, and wherein said plurality of electrical signals are emitted across said thickness mode in response to width mode vibrations which occur in response to said at least a portion of said a plurality of sonic signals.

28. The sonic well logging tool of claim 11, wherein said electronics section further comprises:
   a modulator disposed within said housing for emitting said analog data signal over a frequency range of substantially not more than 40 kHz by determining amplitudes for said analog data signal in response to said plurality of electrical signals which are emitted by said second group of said plurality of sonic transducers.

29. The sonic well logging tool of claim 5, wherein said modulator includes:
   an envelope detector for emitting an output signal in response to integrating amplitudes occurring over said plurality of electrical signals emitted by said second group of said plurality of sonic transducers;
   a sinusoid generator, for emitting a carrier signal having said frequency range of not substantially more than 40 kHz; and
   an amplitude modulator for selecting an amplitude for said carrier signal in response to said output signal emitted by said envelope detector, and thus providing said amplitude modulated analog data signal.

30. The sonic well logging tool of claim 29, wherein said frequency for said amplitude modulated data analog signal substantially measures 20 kHz.

31. The well logging tool of claim 12, wherein said plurality of sonic signals are emitted by a width mode of vibration in response to applying a voltage across said thickness.

32. The sonic well logging tool of claim 31, wherein said width is sized for determining that a primary resonant frequency of said width mode of vibration will occur within a frequency range which is substantially between 90 kHz and 130 kHz.

33. The sonic well logging tool of claim 32, wherein said electronic section further comprises:
   a modulator for emitting an amplitude modulated analog data signal in response to said plurality of electrical signals, which are emitted from said second group of said plurality of sonic transducers and which have a frequency range of substantially between 90 kHz and 130 kHz, wherein said amplitude modulated analog data signal is emitted over a frequency range of substantially not more than 40 kHz for transmitting uphole over a wireline.

34. The sonic well logging tool of claim 33, wherein said modulator includes:
   an envelope detector for emitting an output signal in response to integrating amplitudes occurring over said plurality of electrical signals emitted by said second group of said plurality of sonic transducers;
   a sinusoid generator, for emitting a carrier signal having said frequency measuring substantially 20 kHz; and
   an amplitude modulator for selecting an amplitude for said carrier signal in response to said output signal emitted by said envelope detector, and thus providing said amplitude modulated analog data signal.

35. The method of claim 21, wherein said step of transmitting an amplitude modulated analog data signal uphole comprises the steps of:
   emitting an output signal in response to integrating amplitudes detected for said plurality of electrical signals emitted by said second group of sonic transducers;
   providing a carrier signal having a frequency measuring substantially 20 kHz; and
   selecting an amplitude for said carrier signal in response to said output signal emitted in response to integrating said amplitudes detected for said plurality of electrical signals, and thus providing said amplitude modulated analog data signal.

36. The method of claim 21, wherein said step of sequentially transmitting a plurality of sonic signals from said sonic well logging tool comprises the steps of:
   providing said sonic well logging tool with sector sonic transducers; and
   applying voltage pulses across said sector sonic transducers to induce a mode of vibration in response thereto, wherein said mode of vibration is determined by a dimension for said sector sonic transducers which extends normal to a direction across which said voltage pulses are applied.

* * * * *